United States Patent
Sanders et al.

[19]

[11] Patent Number: 6,129,812
[45] Date of Patent: *Oct. 10, 2000

[54] ABRASION-RESISTANT ELASTOMERIC MEMBER OF A TIRE-BUILDING DRUM

[75] Inventors: Myron D. Sanders; Charles W. Murphy, both of Noblesville, Ind.

[73] Assignee: Bridgestone/Firestone, Inc., Akron, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/982,140

[22] Filed: Jan. 7, 1998

Related U.S. Application Data

[60] Provisional application No. 60/036,389, Jan. 24, 1997.

[51] Int. Cl.⁷ .................................................. B29O 30/26
[52] U.S. Cl. .......................... 156/401; 156/414; 156/416; 425/52
[58] Field of Search ................................. 156/401, 416, 156/403, 414; 425/39, 43, 45, 52, 53, 389

[56] References Cited

U.S. PATENT DOCUMENTS

| | | | |
|---|---|---|---|
| 1,799,933 | 4/1931 | Snyder | 425/53 |
| 3,281,305 | 10/1966 | Nadler et al. | 156/401 |
| 3,932,255 | 1/1976 | Saracsan | 156/401 |
| 3,963,394 | 6/1976 | Shichman et al. | 425/43 |
| 4,249,979 | 2/1981 | Burley | 156/401 |
| 4,853,069 | 8/1989 | Williams et al. | 156/401 |
| 5,213,823 | 5/1993 | Hunt | 156/401 |
| 5,250,142 | 10/1993 | Weimer et al. | 156/401 |

FOREIGN PATENT DOCUMENTS

| | | | |
|---|---|---|---|
| 0 676 265 A2 | 3/1995 | European Pat. Off. | B29C 33/40 |
| 0 676 265 A3 | 4/1996 | European Pat. Off. | B29C 33/40 |
| 0 785 056 A2 | 1/1997 | European Pat. Off. | B29C 33/50 |
| 195 32 217 C1 | 9/1995 | Germany | B29D 30/26 |
| 2 111 427 | 9/1982 | United Kingdom | B32B 27/22 |

*Primary Examiner*—Geoffrey L. Knable
*Attorney, Agent, or Firm*—John M. Vasuta; Michael Sand

[57] ABSTRACT

An elastomeric member for a tire-building machine, such as an inflatable bead turn-up bladder, center sleeve or bead lock sleeve, includes at least one base layer or sleeve of elastomeric material which terminates in a pair of end members for mounting the sleeve on the tire-building machine. A plurality of reinforcing cords may be embedded within the sleeve to provide internal reinforcement. A strip of an abrasion-resistant material is bonded to all or a portion of the inner or outer surfaces of the sleeve to protect those areas of the sleeve that are subject to abrasion when contacting various portions of the tire or tire-building machine during assembly of a green tire carcass. A coating of an adhesion-release material may be applied to portions of the strip of abrasion-resistant material to reduce adhesion of the sleeve to the tacky elastomeric portions of the green tire carcass when contacted by expansion or movement of the sleeve during assembly of the green tire.

12 Claims, 4 Drawing Sheets

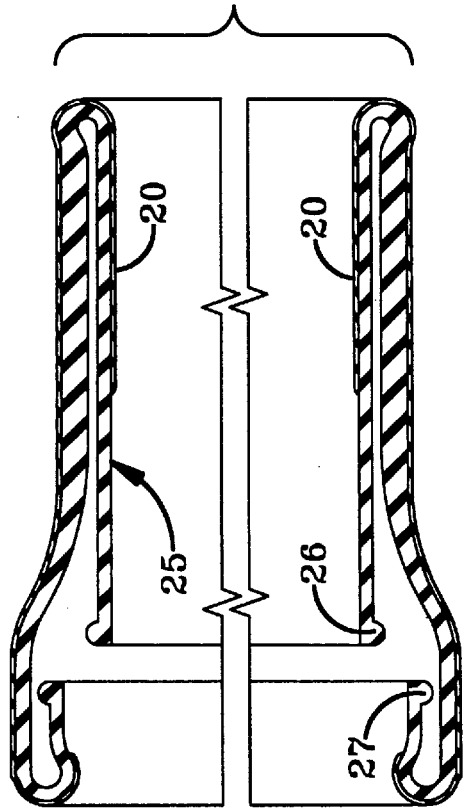
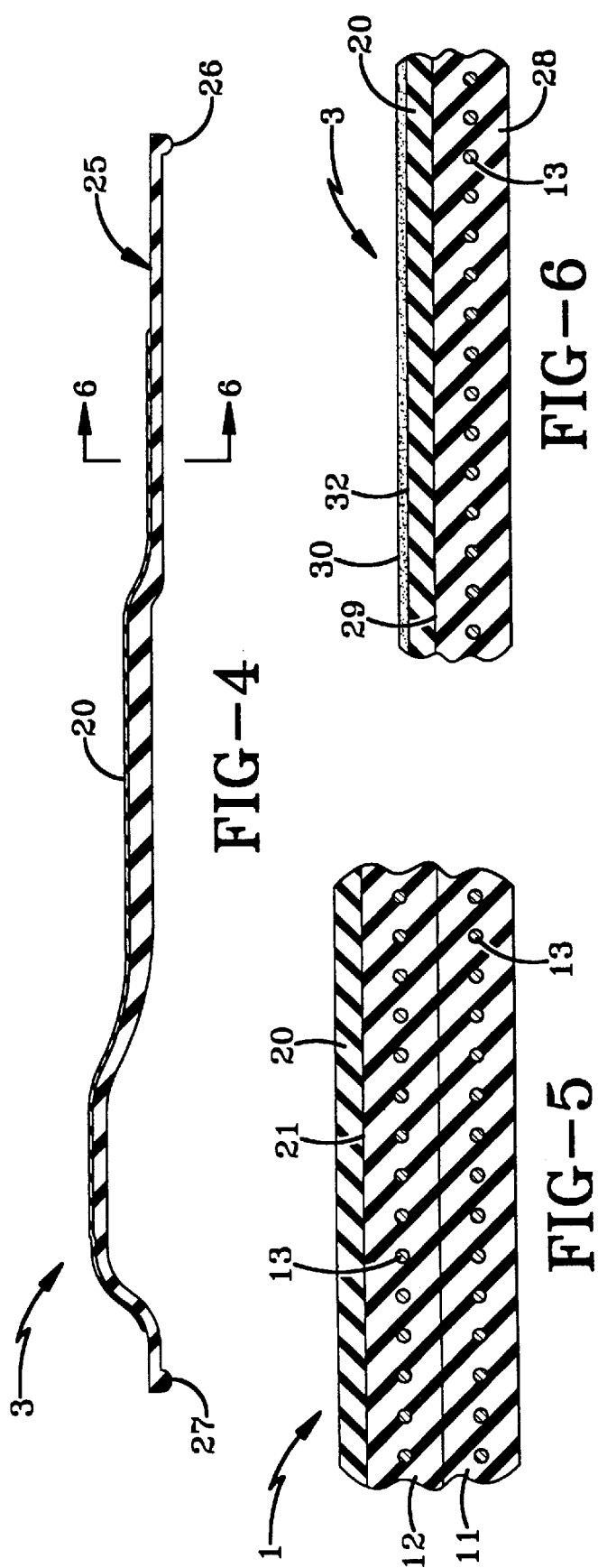

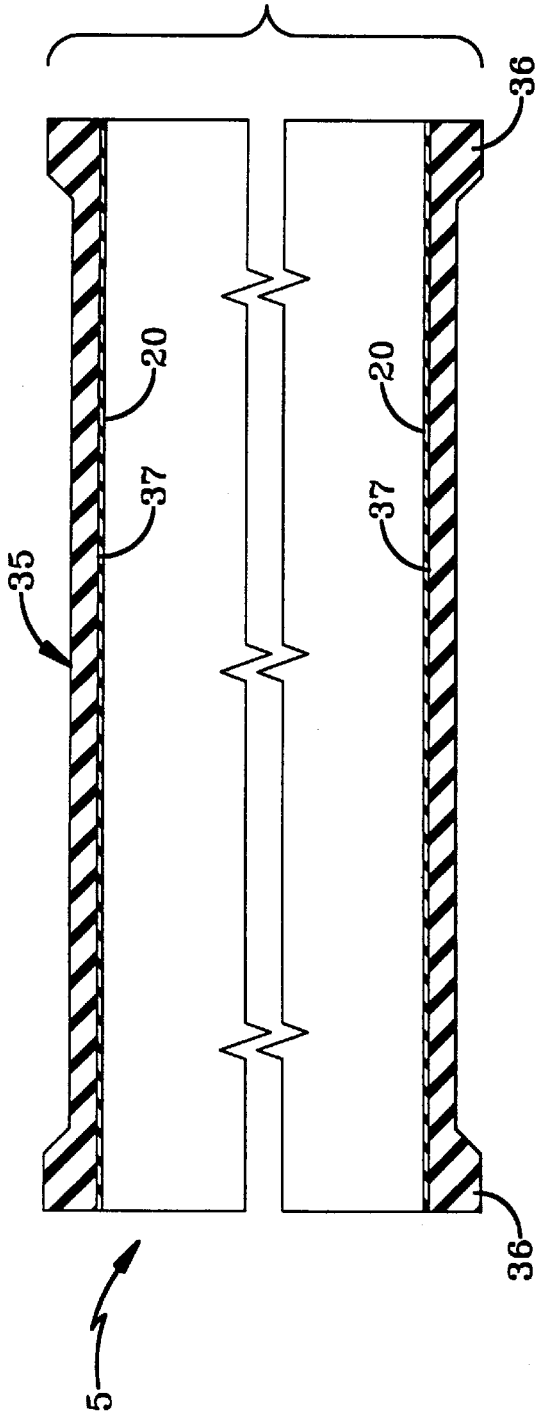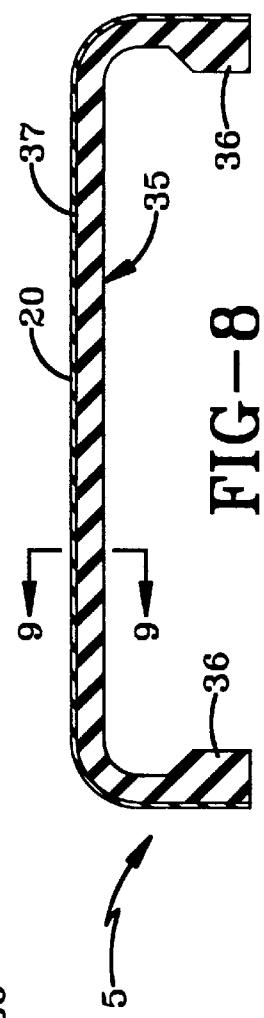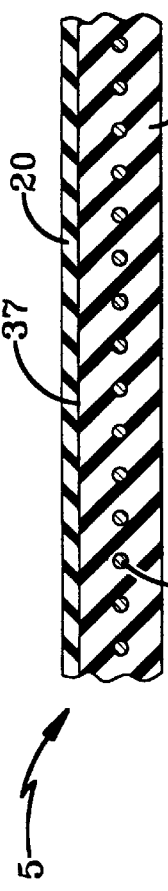

ABRASION-RESISTANT ELASTOMERIC MEMBER OF A TIRE-BUILDING DRUM

This application claims the benefit of U.S. provisional application No, 60/036,389, filed Jan. 24, 1997, which is hereby incorporated by reference.

BACKGROUND OF THE INVENTION

1. Technical Field

The invention relates to tire-building machines for pneumatic tires. More particularly, the invention relates to an elastomeric member or component of the tire-building machine, such as the turn-up bladder, center sleeve or bead lock sleeve, which is subjected to abrasion during operation of the machine when the member is in contact under pressure with a rubber or metal surface during operation of the machine. Even more particularly, the invention relates to a bladder or sleeve having a coat layer of an abrasion-resistant and hard elastomer material bonded on portions of the inner or outer surfaces of the bladder or sleeve to improve bladder and sleeve life by protecting those areas of the member that are subject to abrasion or failure during the building of a pneumatic tire.

2. Background Information

Tire-building machines for the manufacture of pneumatic tires use various elastomeric members, such as a pair of tun-up bladders, adjacent the ends of the machine which, upon inflation, will turn the ends of the carcass plies which have been laid on the tire-building mandrel, up and around the bead rings and back against the ply material These tire-building drums may include a center sleeve or a bead lock sleeve formed of elastomeric material which enables the end segments of the drums to move inwardly, outwardly and radially when forming the toroidal shape of the tire, or to maintain the bead rings in position. These various sleeves and turn-up bladders are subject to abrasion when contacting under pressure certain areas of uncured rubber in the tire components or metal parts, such as the mechanical bead locks or other portions of the tire-building machine, which reduces the life of such a member by wearing certain areas of the sleeve or bladder quicker than other areas. This requires that the sleeves or bladders be replaced more often than desirable, increasing the manufacturing cost for the pneumatic tires. However, it is difficult to adequately guard against the abrasion problems and resulting component failure, especially on the turn-up bladders, since the bladders must remain sufficiently flexible in order to provide the desired turn-up characteristics and performance required for wrapping the carcass ply and carcass ply ends around the bead ring upon inflation.

Another problem with such elastomeric members such as turn-up bladders, is that they are formed of an elastomeric material which has a tendency to stick to the unvulcanized elastomeric green tire components being processed in the machine due to the natural tackiness of these green unvulcanized tire components. This adhesion between the bladder and tire materials can result in unsatisfactory turn-up and undesirable adhesion of the carcass areas around the bead rings. Certain of these problems have been reduced by the use of a release coating and/or a turn-up bladder configuration having externally exposed cords, such as shown in U. S. Pat. Nos. 4,381,331 and 4,853,069.

Other attempts to alleviate such sticking problems involve the use of outside surface coatings on the bladder which are composed of polymer blends of about 10–60 arts polyvinylchloride and about 90–40 parts of an acrylonitrile-butadiene rubber having 25–40 parts acrylonitrile and 60–75 parts butadiene. Such polymer blend coatings are described in U.S. Pat. No. 5,213,823.

Still another proposed solution to such sticking problems involve the use of fabric-covered bladders having their outer surfaces covered with a low adhesive rubber polymer. Such bladders are described in U.S. Pat. Nos. 5,250,142 and 5,324,376.

While such attempts and proposals succeed to greater or lesser extents, the need remains for a turn-up bladder and/or elastomeric sleeve for use on a tire-building drum which have certain areas of the inner or outer surfaces, or both, protected from abrasion by inexpensive and effective means which do not materially affect the flexibility and operation of the elastomeric bladder and/or sleeve.

SUMMARY OF THE INVENTION

Objectives of the invention include providing an improved turn-up bladder and/or sleeve for a tire-building drum in which such a member includes a sleeve of elastomeric material which has a layer of an abrasion-resistant and hard elastomeric material covering at least a part or the entire inner or outer surface of the member to reduce abrasion thereto without materially affecting the flexibility of the member.

Still another objective of the invention is to provide such an elastomeric member which has internal reinforcing cords embedded within the base layers body of the member to provide reinforcement thereto but not exposed from the outside surface layer.

A further objective of the invention is to provide such an elastomeric member which has a second release coating applied to all or to a portion of the hard and abrasion-resistantmaterial to reduce adhesion of the member with the tacky surface of an unvulcanized green tire material with which it comes into contact during manufacturing of a pneumatic tire.

A still further objective of the invention is to provide such a member in which the layer of hard, abrasion-resistant material is in a strip form and is laid on a base sleeve of elastomeric material during manufacture of the member and which is subsequently bonded thereto during vulcanization of the final elastomeric sleeve and/or bladder.

These objectives and advantages are obtained by the improved elastomeric member of the present invention which is used on a tire-building machine, the general nature of which may be stated as including a sleeve or bladder of elastomeric material having inner and outer surfaces and a layer of an abrasion-resistant material covering at least a portion of one of said inner and outer surfaces.

In one aspect of the invention, the above objectives are achieved by an improved elastomeric component for use in a tire building machine, said component having outer and interior surfaces and comprised of at least two layers of elastomeric material, layers A and B, wherein the Shore A hardness of layer A is greater than that of layer B. Often the layer A is disposed to contact a metal surface or tacky rubber surface during operation of the tire building machine and layer B comprises the body of the component. Layer B usually contains mechanical reinforcement in the form of metal or polymeric cord and directly contacts layer A and there is no fabric or cord reinforcement between layer A and layer B. In a preferred aspect of the invention, the component is a turn-up bladder for a passenger tire building machine and at least a portion of the outer surface is layer A and, further, the exterior of layer A is also coated with an adhesion release material which reduces adhesion to uncured rubber passenger tire ply.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

FIG. 3 is a fragmentary sectional view similar to FIG. 2 of a second embodiment turn-up bladder;

FIG. 4 is a cross-sectional view of the bladder of FIG. 3 prior to its being folded into position for mounting on the tire-building machine;

FIG. 5 is an enlarged sectional view taken on line 5—5, FIG. 2;

FIG. 6 is an enlarged cross-sectional view taken on line 6—6, FIG. 4;

FIG. 7 is a fragmentary sectional view of a forming sleeve as molded, having the abrasion-resistant material secured thereto;

FIG. 8 is an enlarged cross-sectional view of the forming sleeve of FIG. 7 after being folded in position for mounting on a tire-building machine;

FIG. 9 is an enlarged fragmentary sectional view taken on line 9—9, FIG. 8;

Similar numerals refer to similar parts throughout the drawings.

DESCRIPTION OF THE PREFERRED EMBODIMENTS

Figure 1:
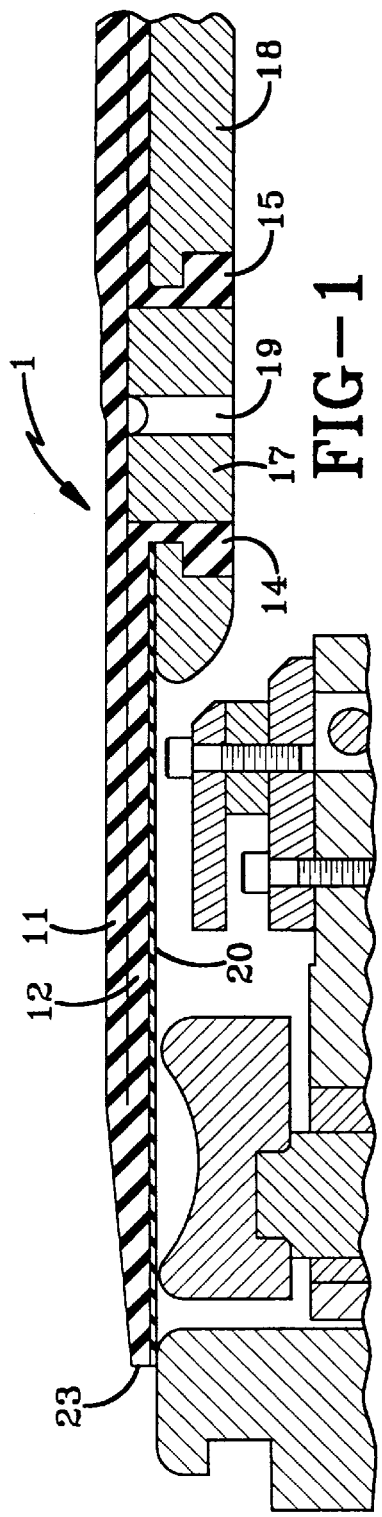
FIG. 1 is a fragmentary sectional view of a turn-up bladder mounted on a portion of a tire-building drum.
Figure 2:
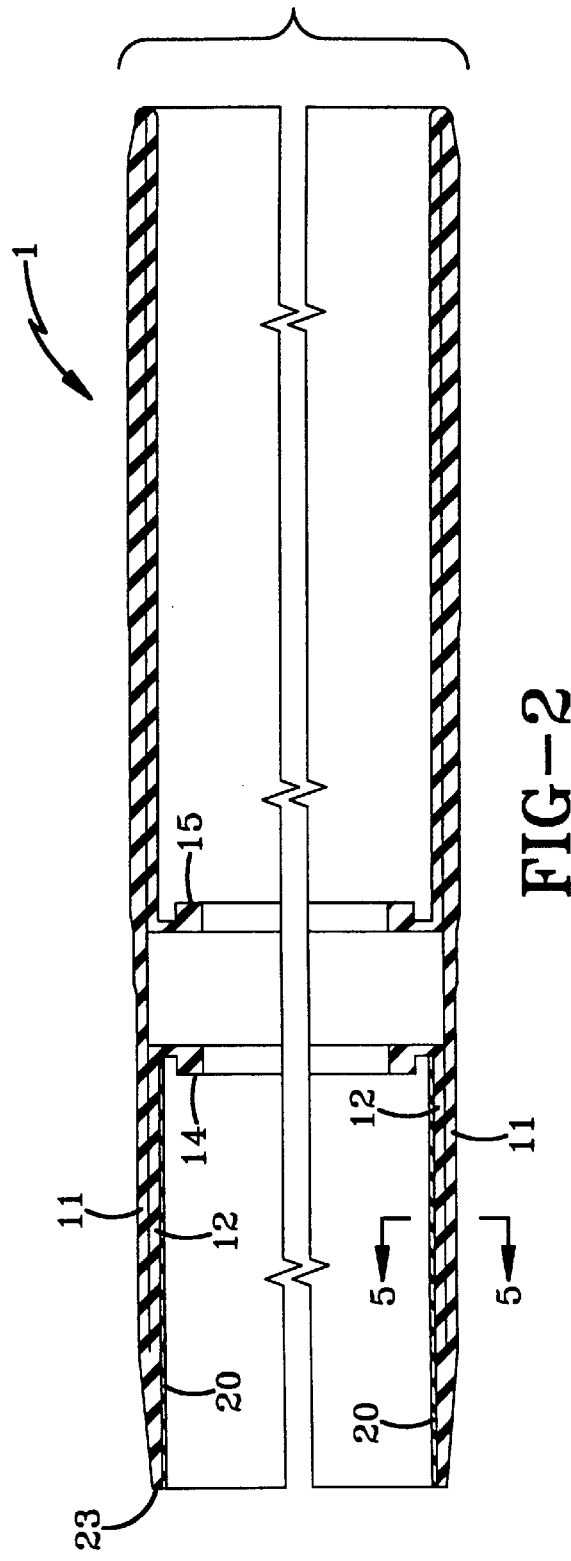
FIG. 2 is a reduced fragmentary cross-sectional view of the first embodiment turn-up bladder shown in FIG. 1 prior to being mounted on the tire-building machine.
Figure 10:
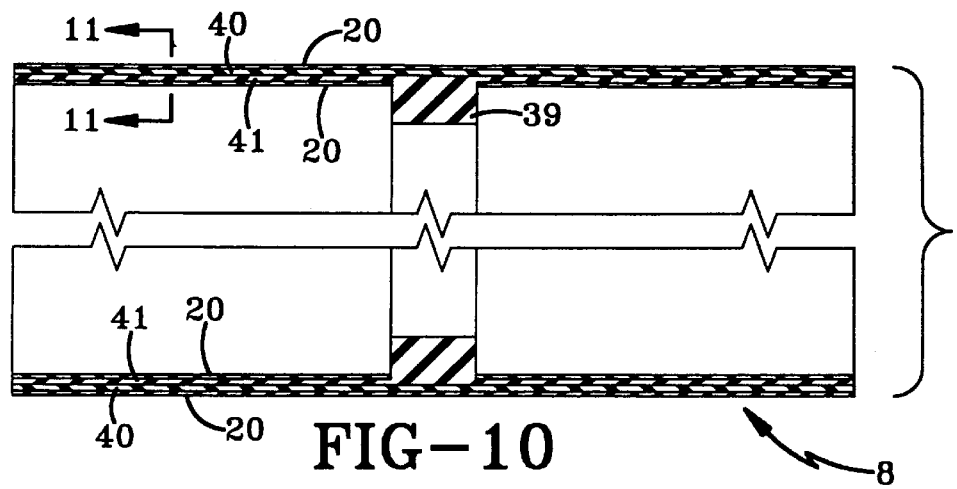
FIG. 10 is a fragmentary cross-sectional view of a center sleeve having the abrasion-resistant material secured thereto prior to mounting on a tire-building drum.
Figure 11:
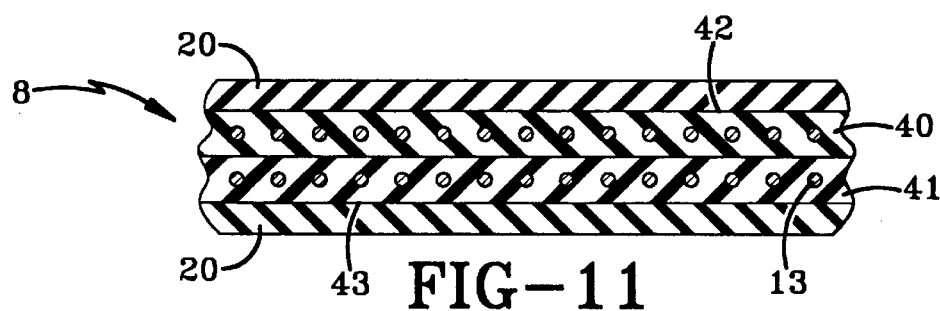
FIG. 11 is an enlarged fragmentary sectional view taken on line 11—11, FIG. 10.
Figure 12:
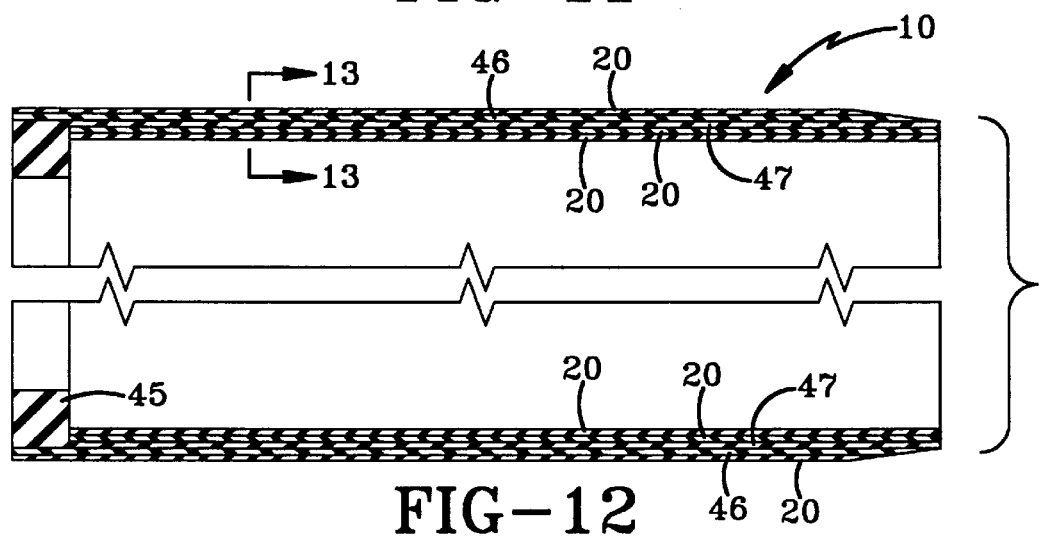
FIG. 12 is a fragmentary cross-sectional view of another type of forming sleeve having the abrasion-resistantmaterial (layer A) as a part thereof.
Figure 13:
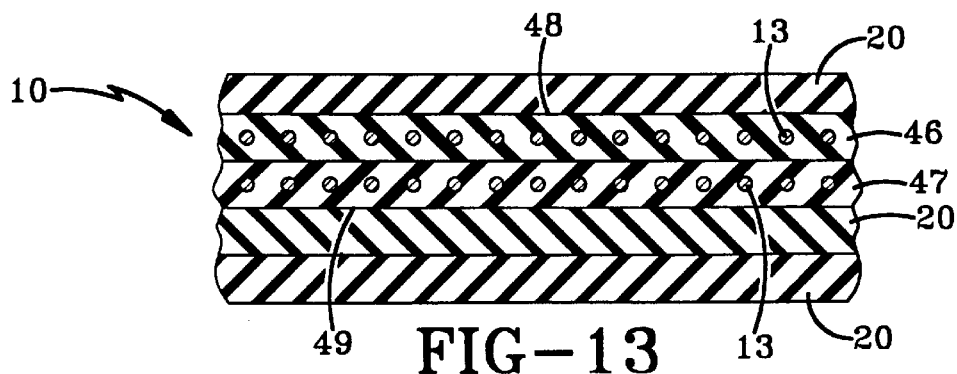
FIG. 13 is an enlarged fragmentary sectional view taken on line 13—13, FIG. 12.

A first embodiment of the improved elastomeric member is indicated generally at 1 and is shown in FIGS. 1, 2 and 5, and shows one type of bead turn-up bladder which is mounted on a portion of a tire-building drum, indicated generally at 2 (FIG. 1). A second type of elastomeric member or bead turn-up bladder is indicated at 3 and is shown in FIGS. 3, 4 and 6. Another embodiment of the improved elastomeric member is shown in FIGS. 7–9 and is indicated generally at 5, and represents one type of shaping or forming sleeve which is used to shape the tire after it has completed its first stage of assembly. A further embodiment of the elastomeric member is shown in FIGS. 10–11 and is indicated generally at 8, and represents a type of center sleeve used on a tire-building drum which is expanded radially outwardly when the inner mandrel or sleeve is expanded for securing the tire components in position. A still further embodiment of the present invention is shown in FIGS. 12–13 and is indicated generally at 10, and represents another type of sleeve which may be used to seal a bead area, which would replace the forming sleeve 5 shown in FIGS. 7–9.

The above various elastomeric members, discussed above and shown in the drawings, are illustrative of some of the various types of elastomeric members that can be used in a tire-building machine which have been improved by the present invention, and no unnecessary limitations should be applied to the scope of protection provided by the invention, since the same can be readily used with other types of elastomeric members, usually in sleeve form, used on various tire-building machines and related types of equipment.

As shown particularly in FIGS. 1, 2 and 5, turn-up bladder 1 includes two base layers 11 and 12 formed of an elastomeric material which has internal reinforcing cords 13 extending throughout. Bladder 1 terminates in a pair of end locking members 14 and 15 for securing the bladder in a usual manner on tire-building machine 2 by a pair of mounting rings 17 and 18, respectively. A usual air passage 19 communicates with the interior of bladder 1 for supplying a fluid into the interior for inflating the bladder.

In accordance with one of the main features of the invention, a layer 20 (layer A) of an abrasion-resistant material, which preferably is in strip form having substantially uniform thickness is laid upon the outer surface 21 of base layer 12 (layer B), which is the inner surface of the sleeve, and will be bonded thereto upon the vulcanization of bladder 1. The hard and abrasion-resistant material 20 may have various constructions, Generally, the hard, abrasion-resistant material of layer A is an elastomeric compound based on styrene-butadiene rubber (SBR) combined with selected compounding ingredients such as carbon black filler, aromatic processing oil, curing agents and additives such as zinc oxide, stearic acid, wax, resin, processing aids, antioxidants, antiozonants and the like. The SBRs useful in preparing the hard, abrasion-resistant materials used in this invention contain about 20–28 weight percent bound styrene and are usually prepared by emulsion polymerization. These SBR exhibit raw Mooney viscosities in the range of about 40–55 (ML-4 at 212° F.). One such useful SBR is Ameripol 5-1502 available from the Ameripol Synpol Corporation of Akron, Ohio, U.S.A.

The above-described SBRs can be compounded using conventional techniques according to the general formulations shown in Table 1.

TABLE 1

| | | Amounts* | |
|---|---|---|---|
| Component Type | Specific Example | Generally | Specific |
| SBR | Ameripol 5-1502 | 100 parts | 100 parts |
| Carbon Black | N-550 | 25–55 | 40 |
| Aromatic Processing Oil | Sundex 790 | 1–5 | 5 |
| Resin Processing Oil | Resinex 115 | 0–4 | 4 |
| Zinc Oxide | — | 2–8 | 6 |
| Stearic Acid | — | 0.5–4 | 2 |
| Anti Oxidant | Age Rite Resin D | 0.5–3 | 2 |
| Wax | Eskar R-45 | 0.5–4 | 2 |
| Curing Agents | Santocure MO-R, NX | 0.5–2 | 1.2 |
| Sulfur | — | 0.5–5 | 5 |

*All amounts, except rubber, are in parts per hundred parts rubber (phr), weight to weight.

Other synthetic sulfur curable elastomers such as Ethylene Propylene Diene Monomer Rubber (EPDM) can be used in place of or in combination with the SBR. Natural rubber can be used in combination with synthetic rubbers, such as EPDM or SBR, but generally it cannot be used alone. Mineral fillers such as clay, silica, talc, calcium carbonate and the like can be used in combination with or in place of the carbon black. Carbon blacks of various grades such as N-550 or mixtures of various grades can be used, such as N-110 plus N-440, as long as the afore-described sufficient hardness and abrasion-resistance properties are achieved in the cured material 20.

Various waxes can be included in abrasion-resistant elastomeric compound of this invention. They function as antiozonants, gloss agents, processing agents and the like. Generally, petroleum or synthetic waxes are used. Among the former are paraffin waxes and microcrystalline waxes. The preferred petroleum waxes are paraffin waxes, particularly those having melting point of about 30–80° C. A specific paraffin wax useful in the invention is Eskar R-45, available from Amoco and having a melting range of 65–76° C. Microcrystalline waxes with melting points of 60–90° C. can also be used in the compounded material 20 (layer A).

Synthetic waxes including such waxes as polyolefin wax (e.g., polyethylene waxes such as PA-510 or -520), and other synthetic waxes such as the fatty acid ester waxes of molecular weights 500–700 can be used.

Mixtures of the afore-described waxes can also be used. In general, the afore-described waxes are used in the amounts of about 0.5–4.0 phr often in the amounts of about 1.5–3.0 phr. The concentration of wax used is, in part, determined by the need to maintain the final elastomeric compound properties within the ranges 60–70 Shore A hardness set forth above.

The hard, abrasion resistance compounded material 20 (layer A) of the afore-described composition is cured, usually after assembly of the bladder or sleeve under conventional conditions such as generally about 300–320° F. for about 15–30 minutes, and typically 300–310° F. for 20–25 minutes. It is essentially that the cured material 20 exhibit abrasion-resistance and hardness properties sufficient for adequate performance in the bladders and sleeves of this invention. Generally, the materials exhibit abrasion-resistance properties in the Lambourne test as shown in Table 2. The general Lambourne test procedures were used with "Safety Walk" paper sold by the 3M Corporation and having an abrasive surface of 120 grit in contact with the sample.

TABLE 2

Abrasion Resistance Properties

| | Maximum Wt. Loss (gms) |
|---|---|
| 25% slip, 50 sec. | 0.110 |
| 65% slip, 20 sec. | 0.190 |

At the same time, the abrasion resistant elastomer materials used as the material 20 in this invention, must exhibit Shore A hardness at 23° C. properties of 60–70 and, typically 62–68 units. Other typical cured properties of the hard, abrasion resistant compounds useful as materials 20 in this invention are shown in Table 3 where they are compared with the properties of prior art materials.

TABLE 3

Cured* Properties of Hard, Abrasion-Resistant Coat Elastomer Material Tensile Properties (instron: Ring Tensile)

| | Invention Material | | Prior Art Materials** | |
|---|---|---|---|---|
| | General | Typical | P.M.-1 | P.M.-2 |
| 23° C. Max Stress (psi) | >3000 | 3485 | 3058 | 2250 |
| Max Strain (%) | >500 | 583 | 515 | 642 |
| 300% Modulus(psi) | >1200 | 1301 | 1175 | 575 |
| 100° C. Max Stress | >1200 | 1307 | 2666 | 434 |
| Max Strain (%) | >400 | 454 | 932 | 567 |
| 300% Modulus (psi) | >750 | 819 | 727 | 250 |

*Cured at 310° F. for 25 minutes.
**Prior Art Material #1 is Natural Rubber Compound used as both body stock and outer layers.

Prior Art Material #2 is PVC-Acrylonitrile/Butadiene material used as outer release layer in bladders.

One particular type of useful abrasion-resistant material 20 is distributed by Bridgestone/Firestone,Inc. and identified as Compound NB907. This consists of a SBR polymer in the amount of 50–60% by weight; 25–35% by weight of carbon black; and an oil of the type used for many rubber compounds, such as an aromatic, naphthenic, paraffinic or similar material, constituting approximately 1–5% by weight of the compound. Other additives normally utilized in such compounds as described above can be added to this final formulation. Preferably, the resulting abrasion-resistantstrip 20 has about 65–70 durometer hardness (Shore A).

The above is only an example of strip 20 and can vary without affecting the concept of the invention as long as it provides a harder abrasion-resistant material than the usual more flexible elastomeric material which forms base layers 11 and 12.

Layer B can generally be formulated with the same components as described above with Layer A but in varying amounts so to make its hardness (Shore A) less than that of Layer A. For example, when Layer A has a hardness of 60, Layer B can have a hardness of 52–58, while when Layer A has a hardness of 70, Layer B can have a hardness of 62–67. In general then Layer B has a hardness (Shore A) of about 3–8 units less than the hardness of Layer A.

As shown in FIGS. 1 and 2, abrasion-resistant material strip 20 is bonded to only a portion of surface 21 and extends from adjacent end locking member 14 to the foldover end 23, which is the particular area which contacts the mechanical bead lock of tire-building drum 2 when mounted thereon, as shown in FIG. 1. As an example, for turn-up bladder 1 having an overall longitudinal length of approximately 25 inches, abrasion-resistant strip 20 will have a length of approximately 8 inches.

Turn-up bladder 3, shown in FIGS. 3, 4 and 6, includes a usual annular sleeve 25, one half of which is shown in FIG. 4, which terminates in a pair of usual end locking members 26 and 27, and when folded for mounting on a tire-building machine, assumes the configuration shown in FIG. 3.

As best shown in FIGS. 4 and 6, a strip of the abrasion-resistant material 20 is mounted on outer surface 29 of a base layer 28 of elastomeric material similar to layers 11 and 12 of turn-up bladder 1, which also may contain reinforcing cords 13. As shown in FIG. 4, abrasion-resistant material strip 20 extends throughout the majority of the longitudinal length of the elastomeric sleeve on outer surface 29 thereof.

In further accordance with the invention, an adhesion-release coating 30 of the type disclosed in U. S. Pat. No. 4,853,069, the contents of which are incorporated herein by reference, is placed along all or a portion of the outer surface 32 of abrasion-resistant material strip 20. As set forth in the above-referenced patent, one type of this release coating consists essentially of chlorosulphonated polyethylene, a carbon black or silica filler, a green tackifying agent, and a chemical curing system.

In one example, turn-up bladder 3 has a longitudinal length, when in the unfolded position of FIG. 4, of 18 inches, with abrasion-resistant material strip 20 having a length of 18 inches, and the adhesion-release coating 30 covering approximately 14 inches of outer surface 32 of strip 20.

Forming sleeve 5, shown in FIGS. 7–9, includes of a base layer or sleeve 35 of a usual elastomeric material, similar to base layers 11, 12 and 28 described above, and may contain reinforcing cords 13 therein. Sleeve 35 terminates in usual end locking members 36. In accordance with the invention, a strip of abrasion-resistantmaterial 20 is secured to outer surface 37 of sleeve 35 when in the formed position of FIG. 8 and may extend throughout the entire length thereof. As an example, base layer 35 may have a thickness of 0.150 inches, with strip 20 having a thickness of 0.030 inches.

Center sleeve 8, as shown in FIGS. 10 and 11, is of a usual cylindrical configuration having an annular interior center mounting rib 39 and is formed of a pair of base layers 40 and 41, similar to the various base layers discussed above, and also may contain reinforcing cords 13. Strips of abrasion-resistant material 20 cover both outer surface 42 and inner surface 43, since both the inner and outer surfaces of the sleeve experience harmful abrasion at various areas thereof. As an example, outer and inner strips of abrasion-resistant material 20 may have a thickness of 0.020 inches, with base layers 40 and 41 each having a thickness of 0.030 inches. Also, it is readily understood that a coating of adhesion-release material 30 could be applied to one or both of the exposed surfaces of abrasion-resistantstrips 20 in further accordance with the invention.

Sleeve 10, shown in FIGS. 12 and 13, has a generally cylindrical shape and terminates at only one end in an annular locking member 45. As shown in FIG. 13, the sleeve consists of a pair of base layers 46 and 47, similar to the various base layers discussed above, which may contain reinforcing cords 13. An outer strip 20 of the abrasion-resistant material is mounted on surface 48 of base layer 46 and extends completely throughout the longitudinal length thereof. A pair of abrasion-resistant strips 20 extend along surface 49 of strip 47 due to the particular harmful abrasion which surface 49 of the sleeve encounters.

As an example, each base layer 46 and 47 will have a thickness of 0.030 inches, with the two adjacent strips 20 each having a thickness of 0.030 inches, with the single strip 20, which extends along the surface 48, having a thickness of 0.25 inches. Again, these thicknesses can vary without affecting the concept of the invention and, depending upon the particular application with which it is used. Also, a layer of adhesion-release coating 30 may be applied to one or more of the strips 20.

In summary, the improved elastomeric member of the present invention includes a usual elastomeric sleeve or base layer which may or may not include reinforcing cords embedded within the interior, and has a coating of an abrasion-resistant material applied thereto, preferably in strip form, to either the inner or outer surface, or both, of the base layer or sleeve, and extends throughout a specific area of the sleeve to be protected, or throughout the entire length, depending upon the particular application with which the sleeve is used in a tire-building drum. As described above, abrasion-resistant strip 20 preferably is laid up in strip form on the sleeve or base layer during its construction when the sleeve in an unvulcanized green state. It may be desirable to provide a continuous strip 20 throughout a specific length of the sleeve instead of two separate strips for protecting two specific areas of the strip to reduce manufacturing and assembling costs. Abrasion-resistant strip 20 is bonded to the elastomeric sleeve or base layer during final formation of the sleeve or bladder in its usual vulcanization process. Likewise, adhesive release coating 30 will be applied to strip 20, preferably after application of the strip to the base layer and prior to final vulcanization and formation of the elastomeric member.

Accordingly, the improved elastomeric member of a tire-building drum is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Moreover, the description and illustration of the invention is by way of example, and the scope of the invention is not limited to the exact details shown or described.

Having now described the features, discoveries and principles of the invention, the manner in which the improved member is constructed and used, the characteristics of the construction, and the advantageous, new and useful results obtained, the new and useful structures, devices, elements, arrangements, parts and combinations, are set forth in the appended claims.

We claim:

1. In a tire building machine, an improved elastomeric component, said component having outer and interior surfaces and comprising at least two layers of elastomeric material, layers A and B, juxtaposed with respect to each other and, wherein the Shore A hardness of layer A is greater than that of layer B and wherein the harder layer A is presented in a form of a cured elastomeric strip, having substantially uniform thickness, on at least a portion of the outer surface.

2. The tire building machine of claim 1, wherein layer A is disposed to contact a metal surface of the tire building machine or a tacky rubber surface during operation of the tire building machine.

3. The tire building machine of claim 2 wherein layer B comprises the body of the component, layer B contains mechanical reinforcement of metal or polymeric cord and layer B directly contacts layer A and there is no fabric or cord between layer A and layer B.

4. The tire building machine of claim 1 wherein the elastomeric material of layer A has a Shore A hardness of about 60–70 at 23° C. after curing.

5. The tire building machine of claim 4 wherein the elastomeric material of layer A has a maximum weight loss at 23° C. of less than 0.110 gm when measured in the Lambourne Test as 25% slip for 50 seconds.

6. The tire building machine of claim 4 wherein the elastomer of layer A comprises a styrene butadiene rubber and a particulate filler.

7. The tire building machine of claim 6 wherein the particulate filler is carbon black.

8. The tire building machine of claim 7 wherein a petroleum wax is also included in the elastomeric layer A.

9. The tire building machine of claim 1 wherein the component is a turn-up bladder.

10. The tire building machine of claim 3 wherein the component is a turn-up bladder.

11. The tire building machine of claim 5 wherein the component is a turn-up bladder.

12. The tire building machine of claim 6 wherein the component is a turn-up bladder, and the exterior of layer A is coated with an adhesion release material to reduce adhesion of layer A to an uncured rubber tire ply.

* * * * *